(12) United States Patent
Masui et al.

(10) Patent No.: US 10,648,866 B2
(45) Date of Patent: May 12, 2020

(54) SERVER DEVICE AND MANAGEMENT SYSTEM

(71) Applicant: TOYOTA JIDOSHA KABUSHIKI KAISHA, Toyota-shi (JP)

(72) Inventors: Junya Masui, Nagoya (JP); Etsuko Nakajima, Nagoya (JP); Naoki Uenoyama, Nisshin (JP); Akira Hoshino, Nagoya (JP); Hideo Hasegawa, Nagoya (JP); Keiko Nakano, Kawasaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/929,047

(22) Filed: Sep. 24, 2018

(65) Prior Publication Data

US 2019/0154516 A1    May 23, 2019

(30) Foreign Application Priority Data

Nov. 20, 2017 (JP) .................................. 2017-222900

(51) Int. Cl.
| | | |
|---|---|---|
| G01K 13/00 | (2006.01) | |
| G01K 3/00 | (2006.01) | |
| G08B 21/18 | (2006.01) | |
| G01K 1/02 | (2006.01) | |

(52) U.S. Cl.
CPC ............. *G01K 3/005* (2013.01); *G01K 1/022* (2013.01); *G01K 13/00* (2013.01); *G08B 21/18* (2013.01); *G01K 2205/00* (2013.01); *G01K 2207/04* (2013.01)

(58) Field of Classification Search
CPC ...................................................... G01K 3/005
See application file for complete search history.

(56) References Cited

U.S. PATENT DOCUMENTS

| 2010/0076902 A1* | 3/2010 | Kraft .................. G06K 17/0022 |
| | | 705/333 |
| 2010/0127881 A1* | 5/2010 | Schechter .......... H05K 7/20836 |
| | | 340/584 |

FOREIGN PATENT DOCUMENTS

| JP | 2006-206225 | 8/2006 |
| JP | 2015-048236 | 3/2015 |

* cited by examiner

*Primary Examiner* — Qutbuddin Ghulamali
(74) *Attorney, Agent, or Firm* — Oblon, McClelland, Maier & Neustadt, L.L.P.

(57) ABSTRACT

A server device includes a controller. The controller is configured to acquire temperature information that is information associated with a temperature of a predetermined area inside a vehicle, the predetermined area being configured to store a luggage and the predetermined area being configured to be locked and unlocked. The controller is configured to acquire luggage information that is information on the luggage to be stored in the predetermined area, and determine whether the predetermined area is an environment suitable for storage of the luggage at a scheduled storage time of the luggage based on the luggage information and the temperature information.

15 Claims, 6 Drawing Sheets

| VEHICLE ID | DATE | TIME | TEMPERATURE (°C) INSIDE VEHICLE |
|---|---|---|---|
| V001 | 8/26/2017 | 11:00 | 43 |
| V001 | 8/26/2017 | 12:00 | 45 |
| V001 | 8/26/2017 | 13:00 | 52 |
| V001 | 8/26/2017 | 14:00 | 53 |
| V001 | 8/26/2017 | 15:00 | 48 |
| ... | ... | ... | ... |

| TIME PERIOD | PREDICTED MAXIMUM TEMPERATURE | DELIVERY AVAILABILITY |
|---|---|---|
| 8:00 TO 12:00 | 55°C | NO |
| 14:00 TO 16:00 | 60°C | NO |
| 16:00 TO 18:00 | 40°C | NO |
| 18:00 TO 20:00 | 30°C | YES |
| 19:00 TO 21:00 | 25°C | YES |

SERVER DEVICE AND MANAGEMENT SYSTEM

INCORPORATION BY REFERENCE

The disclosure of Japanese Patent Application No. 2017-222900 filed on Nov. 20, 2017 including the specification, drawings and abstract is incorporated herein by reference in its entirety.

BACKGROUND

1. Technical Field

The present disclosure relates to a server device and a management system for managing storage of a luggage.

2. Description of Related Art

A technology for delivering a delivery object using a trunk of a consignment vehicle designated as a delivery destination by a recipient has been proposed (see, for example, Japanese Unexamined Patent Application Publication No. 2006-206225 (JP 2006-206225 A)). According to the technology, the recipient designates a vehicle owned by the recipient as the delivery destination, such that the recipient can receive the delivery object in the absence of the recipient without installing a home delivery locker or the like for receiving the delivery object.

SUMMARY

Meanwhile, since a parked vehicle is a sealed space, the vehicle is not necessarily suitable for temporary storage of a luggage. For example, during a summer season, the inside of the vehicle cabin is at a high temperature at which it is easy for bacteria to grow, and thus, a luggage including raw food cannot be stored in the vehicle.

The present disclosure provides a server device and a management system that determine whether or not temporary storage of a luggage using a closed space can be appropriately performed.

A first aspect of the present disclosure relates to a server device including a controller. The controller is configured to acquire temperature information that is information associated with a temperature of a predetermined area inside a vehicle, the predetermined area being configured to store a luggage and the predetermined area being configured to be locked and unlocked, acquire luggage information that is information on the luggage to be stored in the predetermined area, and determine whether or not the predetermined area is an environment suitable for storage of the luggage at a scheduled storage time of the luggage based on the luggage information and the temperature information.

According to the first aspect of the present disclosure, the predetermined area is an area of a facility in which storage of a luggage, and locking and unlocking are possible. For example, a car cabin, a trunk, or the like of a car is an example, but the area is not necessarily limited to the above. Hereinafter, although the description will be given in which an example of the area is the car, the present disclosure is also applicable to things other than the car. The temperature information is information associated with a temperature of the predetermined area inside the vehicle and can be acquired from a sensor or the like included inside the vehicle cabin over a network, for example. The temperature information may not necessarily be a value indicating the temperature as long as the temperature information is associated with the temperature. The luggage information is information on a luggage of which the storage in the vehicle is scheduled. The luggage information may include, for example, information indicating content of the luggage or a scheduled storage time period. The controller determines whether or not the luggage can be appropriately stored based on the temperature information acquired from the vehicle and the luggage information corresponding to the luggage of which the storage in the vehicle is scheduled. For example, when the inside of the vehicle cabin is expected to be at a high temperature at which it is easy for bacteria to grow at the scheduled storage of the luggage, and raw food or groceries are included in the luggage, a determination is made that the luggage cannot be appropriately stored. The determination may be made based on data at a current time point or may be made based on a result of prediction using past data. According to the configuration as described above, it is possible to further suppress troubles such as deterioration of the stored luggage due to the temperature inside the vehicle.

In the server device according to the first aspect of the present disclosure, the luggage information may include a time period in which the storage of the luggage is scheduled, and information on content of the luggage.

According to the first aspect of the present disclosure, it is possible to appropriately predict the temperature inside the vehicle at the time of storage using the time period in which the storage of the luggage is scheduled. It is possible to determine whether or not the storage of the luggage can be appropriately performed by using information on the content of the luggage (for example, information indicating whether the luggage is the raw food or whether the luggage is groceries).

In the server device according to the first aspect of the present disclosure, the controller may be configured to perform a notification to a predetermined device when the controller determines that the predetermined area is an environment not suitable for storage of the luggage at the scheduled storage time of the luggage.

According to the first aspect of the present disclosure, when a determination is made that the storage of the luggage cannot be appropriately performed, for example, a notification to a portable terminal possessed by a person in charge of delivery or the like, a server device managed by a delivery company or the like, a portable terminal possessed by a consignee, or the like may be performed. According to the configuration as described above, it is possible to rapidly perform changing of a recipient or a date and time.

In the server device according to the first aspect of the present disclosure, the controller may be configured to transmit key information for unlocking the predetermined area to a portable terminal possessed by a user storing the luggage when the controller determines that the predetermined area is an environment suitable for storage of the luggage at the scheduled storage time of the luggage.

According to the first aspect of the present disclosure, the key information is electronic data for locking and unlocking the predetermined area inside the vehicle, such as a vehicle cabin or a trunk. For example, the portable terminal transmits the key information to the vehicle and performs authentication, such that the area in which the luggage is stored can be locked and unlocked. The key information is transmitted solely when a determination is made that the storage of the luggage can be appropriately performed, such that troubles due to oversight of the notification can be further avoided.

In the server device according to the first aspect of the present disclosure, the controller may be configured to periodically acquire and store temperature information associated with the predetermined area from the vehicle. In the server device according to the first aspect of the present disclosure, the controller may be configured to predict the temperature of the predetermined area after the luggage is stored by referring to the stored temperature information and make the determination based on a result of the prediction.

According to the first aspect of the present disclosure, it is possible to accumulate past data by periodically acquiring and storing the temperature information from the vehicle. The accumulated data is used such that prediction of the temperature inside the vehicle after the luggage is stored can be accurately performed. The content of the prediction may be a maximum temperature or may be a transition of the temperature after the storage of the luggage.

In the server device according to the first aspect of the present disclosure, the controller may be configured to predict the temperature of the predetermined area in a time period before and after the luggage is stored by referring to the stored temperature information, and further determine a time period in which the predetermined area becomes an environment suitable for storage of the luggage.

According to the first aspect of the present disclosure, the temperature can be estimated in the time periods before and after a time at which the storage of the luggage is scheduled, such that a determination can be made as to whether or not the storage is possible in a time period other than a designated time period. That is, it is possible to determine that the storage of the luggage becomes possible by changing the time period.

The server device according to the first aspect of the present disclosure may further include a storage unit configured to store the temperature information acquired by the controller.

A second aspect of the present disclosure relates to a management system. The management system includes a vehicle including a predetermined area configured to store a luggage, the predetermined area being configured to be locked and unlocked, and a server device configured to determine whether or not the storage of the luggage in the vehicle is available. The vehicle includes a temperature information transmission unit configured to transmit temperature information that is information associated with a temperature of the predetermined area inside the vehicle, to the server device, and the server device includes a controller. The controller is configured to acquire the temperature information, acquire luggage information that is information on the luggage to be stored in the predetermined area, and determine whether or not the predetermined area is an environment suitable for storage of the luggage at a scheduled storage time of the luggage based on the luggage information and the temperature information.

A third aspect of the present disclosure relates to a server device including a controller. The controller is configured to acquire temperature information that is information associated with a temperature of a predetermined area inside a storage device, the predetermined area being configured to store a luggage and the predetermined area being configured to be locked and unlocked, acquire luggage information that is information on the luggage to be stored in the predetermined area, and determine whether or not the predetermined area is an environment suitable for storage of the luggage at a scheduled storage time of the luggage based on the luggage information and the temperature information.

The aspects of the present disclosure can be specified as the server device including at least some of the above means. The aspects of the present disclosure can be specified as the management system including the server device. The above processes or means can be freely combined and implemented as long as technical contradiction does not occur.

According to the aspects of the present disclosure, it is possible to determine whether or not the temporary storage of the luggage using the vehicle can be appropriately performed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

System Overview

Figure 1:
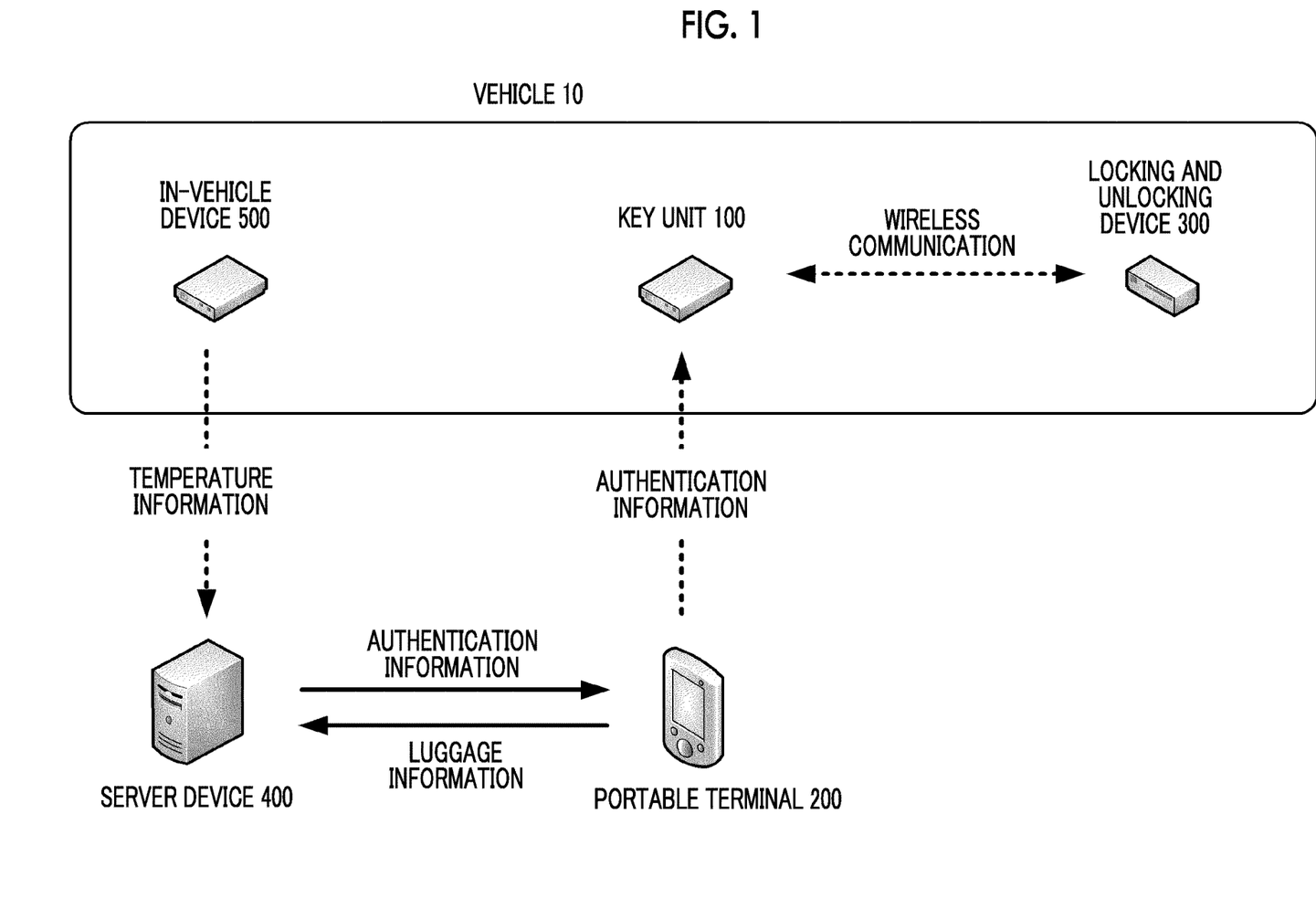
FIG. 1 is a system schematic diagram of a delivery system according to a first embodiment.

An overview of a delivery system according to a first embodiment will be described with reference to FIG. 1. The delivery system according to the first embodiment includes a key unit 100 and a locking and unlocking device 300 mounted on a vehicle, a portable terminal 200, a server device 400, and an in-vehicle device 500. In the delivery system according to the first embodiment, the key unit 100 including the same wireless interface as an electronic key (a portable device) of a smart key is mounted on the vehicle 10, and can perform locking and unlocking of the vehicle without using a physical key by performing communication with the previously provided locking and unlocking device 300. The key unit 100 performs short-range wireless communication with the portable terminal 200 and determines whether or not the key unit 100 operates as an electronic key of the vehicle 10 based on a result of authenticating the portable terminal 200. That is, a user of the system can perform locking and unlocking by manipulating the portable terminal 200 from the outside of the vehicle 10.

The server device 400 is a device that issues information used for the key unit 100 to authenticate the portable terminal 200. The server device 400 acquires information on a temperature inside the vehicle from the in-vehicle device 500 included in the vehicle 10, and determines whether or not a luggage can be temporarily stored in a target vehicle by referring to the temperature information when there is a request from the portable terminal 200. Solely when the server device 400 determines that the storage of the luggage is available, the authentication information is issued.

System Configuration

Figure 2:
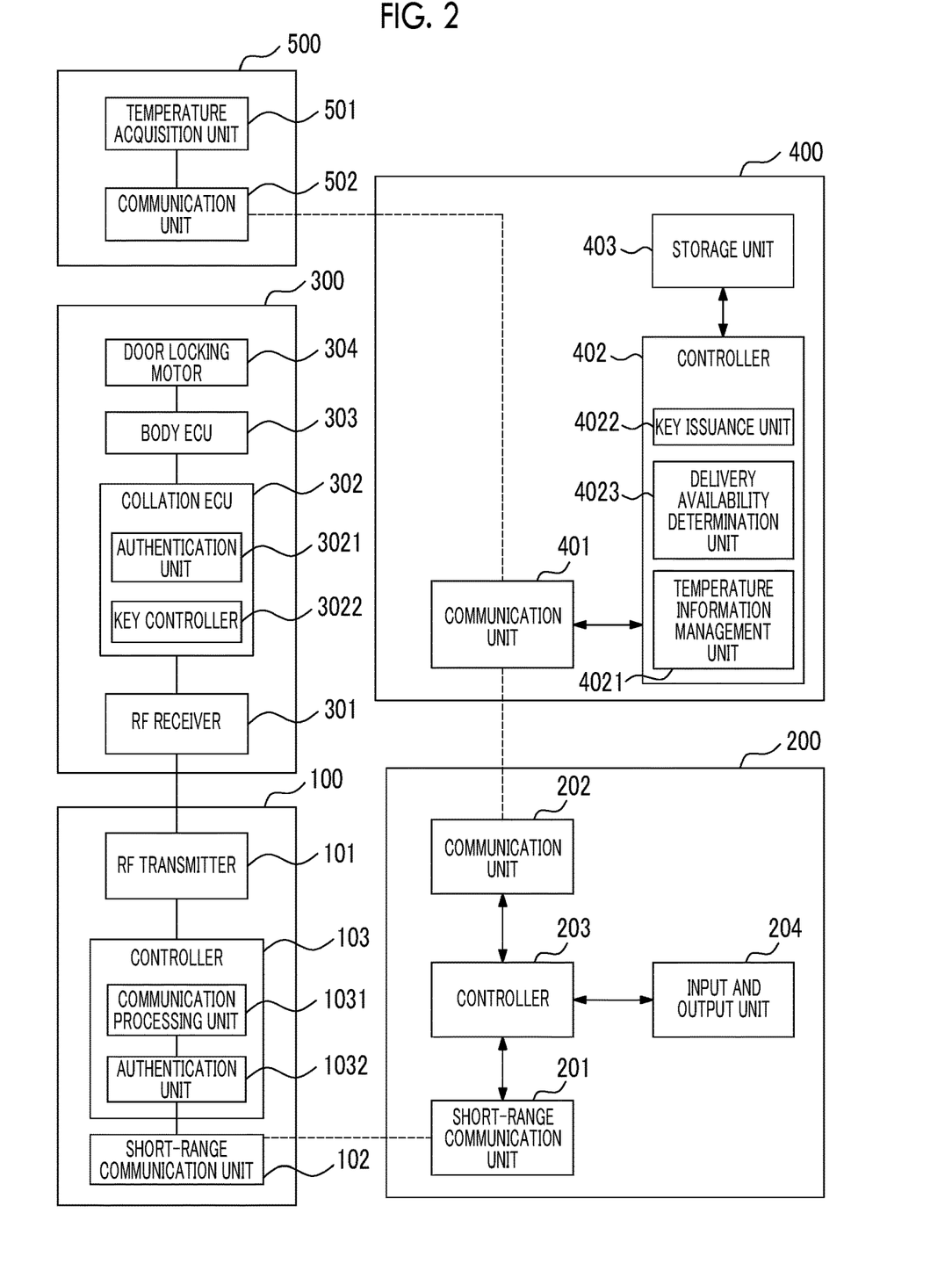
FIG. 2 is a block diagram schematically illustrating an example of components included in a delivery system.

Components of the system will be described in detail. FIG. 2 is a block diagram schematically illustrating an example of a configuration of the key unit 100, the portable terminal 200, the locking and unlocking device 300, the server device 400, and the in-vehicle device 500 illustrated in FIG. 1. Among them, the key unit 100, the locking and unlocking device 300, and the in-vehicle device 500 are mounted on the vehicle 10 that is a locking and unlocking target.

The locking and unlocking device 300 is a device for locking and unlocking doors of the vehicle and is a previously provided device constituting a part of the smart key system. Specifically, the locking and unlocking device 300 locks and unlocks the doors of the vehicle 10 according to a locking signal and an unlocking signal that are transmitted from an electronic key (hereinafter referred to as a portable device) possessed by a user of the vehicle via radio waves in a high frequency (a radio frequency; hereinafter referred to as an RF) band.

In the embodiment, the key unit 100 transmits the radio waves in the RF band instead of the portable device possessed by the user to control the locking and unlocking of the door of the vehicle. In particular, unless explicitly described, description will be given in which a communication destination of the locking and unlocking device 300 is limited to the key unit 100.

The locking and unlocking device 300 includes an RF receiver 301, a collation electronic control unit (ECU) 302, a body ECU 303, and a door locking motor 304. The locking and unlocking device 300 operates with electric power supplied from an auxiliary battery (not illustrated) mounted on the vehicle 10.

The RF receiver 301 is means for receiving radio waves in a radio frequency band (for example, 100 MHz to 1 GHz) transmitted from the key unit 100. The RF receiver 301 is built in any place in the vehicle cabin.

The collation ECU 302 is a computer that performs control to lock and unlock the doors of the vehicle 10 based on a signal (a locking signal or an unlocking signal) transmitted from the key unit 100 via the radio waves in the RF band. The collation ECU 302 is configured of, for example, a microcomputer. In the following description, the locking signal and the unlocking signal are collectively referred to as a locking and unlocking signal. The term locking and unlocking signal indicates at least one of the locking signal and the unlocking signal.

The collation ECU 302 includes an authentication unit 3021 and a key controller 3022 as functional modules. Each of the functional modules may be realized by a program stored in a storage means (read only memory (ROM) or the like) being executed by a central processing unit (CPU) (both not illustrated).

An authentication unit 3021 authenticates that the locking and unlocking signal transmitted from the key unit 100 is a signal transmitted from an authorized device. Specifically, the authentication unit 3021 determines whether or not a key ID included in the locking and unlocking signal matches a key ID stored in storage means (not illustrated) included in the collation ECU 302 in advance. Specific content will be described below.

A key controller 3022 transmits an unlocking command or a locking command to the body ECU 303 to be described below based on a result of authentication performed by the authentication unit 3021. The signal is transmitted via an in-vehicle network such as a controller area network (CAN).

The body ECU 303 is a computer that performs body control of the vehicle. The body ECU 303 has a function of controlling the door locking motor 304 to be described below based on the received unlocking command or locking command to perform unlocking and locking the door of the vehicle. The body ECU 303 may further have a function of performing controls of elements associated with the vehicle body, such as power window control, seat adjustment, anti-theft, seatbelt control, and headlight control.

The door locking motor 304 is an actuator that locks and unlocks the doors of the vehicle 10 (including a trunk, as well as a door for getting on and off or a rear gate). The door locking motor 304 operates based on a signal transmitted from the body ECU 303.

The collation ECU 302 may transmit solely information indicating that authentication has been successful, to the body ECU 303 instead of the unlocking command or the locking command. With the above-described configuration, it is possible to cause a locking or unlocking operation to be performed using an action of the user (for example, pressing of an unlocking button or touch to a door knob) as a trigger.

Next, the key unit 100 will be described. The key unit 100 is a device disposed inside the vehicle 10 and has a function of authenticating the portable terminal 200 by performing short-range wireless communication with the portable terminal 200, and a function of transmitting a locking and unlocking signal using radio waves in the RF band based on a result of authenticating the portable terminal 200. The key unit 100 includes an RF transmitter 101, a short-range communication unit 102, and a controller 103.

In the embodiment, the key unit 100 is disposed at a predetermined position in the vehicle cabin (for example, in a glove box) and operates with electric power supplied from an auxiliary battery (not illustrated) mounted on the vehicle 10.

The RF transmitter 101 is a module that transmits a locking and unlocking signal to the key unit 100 via radio waves of the RF band.

The short-range communication unit 102 is a module that communicates with the portable terminal 200 possessed by the user. The short-range communication unit 102 performs communication in a short range (to the extent that communication can be performed inside and outside the vehicle cabin) using a predetermined wireless communication standard.

In the embodiment, the short-range communication unit 102 performs data communication based on the Bluetooth (registered trademark) Low Energy standard (hereinafter referred to as a BLE). The BLE is a low power communication standard based on Bluetooth, and has characteristics that communication can be started immediately by detecting a partner without needing pairing of devices. Although the BLE is illustrated in the embodiment, other wireless communication standards can also be used. For example, Near Field Communication (NFC), Ultra Wide Band (UWB), or WiFi (registered trademark) can be used.

The controller 103 is a module that performs short-range wireless communication with the portable terminal 200 via the short-range communication unit 102 and performs control to authenticate the portable terminal 200 and control to transmit the locking and unlocking signal based on an authentication result. The controller 103 is configured of, for example, a microcomputer.

The controller 103 includes a communication processing unit 1031 and an authentication unit 1032 as functional modules. Each of the functional modules may be realized by a program stored in storage means such as a ROM being executed by a CPU (both not illustrated).

A communication processing unit 1031 processes communication with the portable terminal 200 via the short-range communication unit 102. Specifically, the communication processing unit 1031 receives a locking request or an unlocking request (hereinafter collectively referred to as a locking and unlocking request) from the portable terminal 200, and generates a locking and unlocking signal according to the received request. The generated locking and unlocking signal is temporarily stored, and is output at a timing when the authentication unit 1032 to be described below successfully authenticates the portable terminal 200.

The authentication unit 1032 performs authentication of the portable terminal 200 based on the authentication information included in the locking and unlocking request transmitted from the portable terminal 200. Specifically, the authentication unit 1032 compares the authentication information stored in storage means (not illustrated) with the authentication information transmitted from the portable terminal 200, and determines that the authentication has been successful when both the pieces of authentication information match. When the two pieces of authentication information do not match, the authentication unit 1032 determines that authentication has failed. When the authentication unit 1032 successfully authenticates the portable terminal 200, the locking and unlocking signal generated by the communication processing unit 1031 is wirelessly transmitted to the locking and unlocking device 300 via the RF transmitter 101. A scheme of the authentication performed by the authentication unit 1032 may be a scheme of simply comparing the authentication information with each other to verify the identity or a scheme using asymmetric encryption. Hereinafter, the authentication information stored in the key unit 100 is referred to as device authentication information, and the authentication information transmitted from the portable terminal 200 is referred to as terminal authentication information, as needed for description.

The key unit 100 simultaneously transmits the locking and unlocking signal and an ID of the electronic key (hereinafter referred to as a key ID) to the locking and unlocking device 300. The key ID may be stored in the key unit 100 in a plaintext state in advance or may be stored in a state encrypted with a cryptogram unique to the portable terminal 200. When the key ID is encrypted and stored, the encrypted key ID may be decoded using authentication information transmitted from the portable terminal 200 such that an original key ID can be obtained.

Next, the portable terminal 200 will be described. The portable terminal 200 is a smartphone, a mobile phone, a tablet terminal, a personal information terminal, or a compact computer such as a wearable computer (smart watch or the like). The portable terminal 200 includes a short-range communication unit 201, a communication unit 202, a controller 203, and an input and output unit 204.

The short-range communication unit 201 is means for performing communication with the key unit 100 according to the same communication standard as that of the short-range communication unit 102. The communication unit 202 is communication means for connecting the portable terminal 200 to the network. In the embodiment, it is possible to communicate with another device (for example, the server device 400) over a network using a mobile communication service such as 3G or LTE.

The controller 203 is means for controlling the portable terminal 200. The controller 203 performs, for example, a process of generating a locking and unlocking request, a process of acquiring the terminal authentication information described above, and a process of transmitting the locking and unlocking request and the terminal authentication information to the key unit 100. The controller 203 is configured of, for example, a microcomputer. The controller 203 may realize the above-described function by executing a program stored in the storage means such as a ROM using a CPU (both not illustrated).

The controller 203 performs interaction with the user via the input and output unit 204. The input and output unit 204 is means for receiving an input manipulation performed by the user and presenting information to the user. Specifically, the input and output unit 204 includes a touch panel, control means for the touch panel, a liquid crystal display, and control means for the liquid crystal display. The touch panel and the liquid crystal display are configured of one a touch panel display in the embodiment.

The controller 203 displays a manipulation screen on the input and output unit 204, and generates an unlocking request or a locking request based on a manipulation performed by the user. For example, the controller 203 outputs an icon for unlocking, an icon for locking, and the like on the touch panel display, and generates an unlocking request or a locking request based on the manipulation performed by the user. The manipulation performed by the user is not limited to the manipulation via the touch panel display. For example, the manipulation may be a manipulation using a hardware switch or the like.

The controller 203 performs a process of acquiring the terminal authentication information. In the first embodiment, the terminal authentication information is generated in the server device 400 and transmitted to the portable terminal 200 via the communication unit 202. When the portable terminal 200 does not have the terminal authentication information, a locking manipulation and an unlocking manipulation from the manipulation screen are impossible.

The terminal authentication information acquired by the portable terminal 200 may be an immutable key or may be a one-time key. In either case, the device authentication information corresponding to the terminal authentication information is stored in advance in the key unit 100.

Next, the in-vehicle device 500 will be described. The in-vehicle device 500 is mounted on the vehicle 10 and has a function of measuring a temperature inside the vehicle cabin and transmitting the temperature to the server device 400. The in-vehicle device 500 includes a temperature acquisition unit 501 that is means for acquiring temperature information, and a communication unit 502 that transmits the temperature information acquired by the temperature acquisition unit 501 to the server device 400.

The temperature acquisition unit 501 is means for measuring a temperature of an area (for example, a cabin or a trunk) within the vehicle cabin in which a luggage can be stored, using a built-in temperature sensor. The measured temperature is converted into data as temperature information. The communication unit 502 is a communication interface for communicating with the server device 400 via a network (a mobile communication service), similar to the communication unit 202. In the first embodiment, the in-vehicle device 500 is always connected to the network, and has a function of periodically acquiring the temperature information and transmitting the temperature information to the server device 400 together with an identifier of the vehicle.

Next, the server device 400 will be described. The server device 400 is a device that issues terminal authentication information according to a request from the portable terminal 200. The server device 400 has a function of determining whether or not a target luggage can be appropriately stored in the target vehicle by referring to the temperature information received from the in-vehicle device 500 and information on the luggage (hereinafter referred to as luggage information) received from the portable terminal 200.

The server device 400 includes a communication unit 401, a controller 402, and a storage unit 403. The communication unit 401 is a communication interface for communicating with the portable terminal 200 over the network, similar to the communication unit 202.

The controller 402 is means for controlling the server device 400. The controller 402 is configured of, for example, a CPU. The controller 402 includes a temperature information management unit 4021, a key issuance unit 4022, and a delivery availability determination unit 4023 as functional modules. Each functional module may be realized by a program stored in storage means such as a ROM being executed by a CPU (both not illustrated).

The temperature information management unit 4021 is means for acquiring temperature information from the in-vehicle device 500 included in the vehicle 10 and stores the temperature information in a storage unit 403 to be described below. The acquisition of the temperature information may be performed periodically, or may be performed when there is a request from the portable terminal 200.

The key issuance unit 4022 is means for issuing terminal authentication information according to a request from the portable terminal 200. The terminal authentication information is authentication information for performing locking and unlocking of the vehicle 10 via the key unit 100, as described above. When the key issuance unit 4022 receives a request for issuing the terminal authentication information from the portable terminal 200, the key issuance unit 4022 issues terminal authentication information corresponding to the key unit 100 included in the vehicle 10 that is a target (that is, corresponding to the device authentication information stored in the key unit). For the terminal authentication information, terminal authentication information stored in advance may be acquired or the terminal authentication information may be generated dynamically. For example, authentication information is valid solely in a predetermined time period, authentication information in which the number of times of use is designated, or authentication information which can be used solely in a predetermined portable terminal can be generated. In the first embodiment, it is possible to issue the terminal authentication information when the delivery availability determination unit 4023 to be described below determines that the target luggage can be appropriately stored in the target vehicle.

The delivery availability determination unit 4023 is means for determining whether or not the target luggage can be appropriately stored in the target vehicle based on the temperature information stored in the storage unit 403 and the luggage information received from the portable terminal 200. A detailed process will be described below.

The storage unit 403 is means for storing information, and is configured of a storage medium such as a random access memory (RAM), a magnetic disk, or a flash memory. The storage unit 403 stores the temperature information acquired from the vehicle, the terminal authentication information corresponding to the key unit 100, and various data for generating the terminal authentication information.

System Operation

Figure 3:
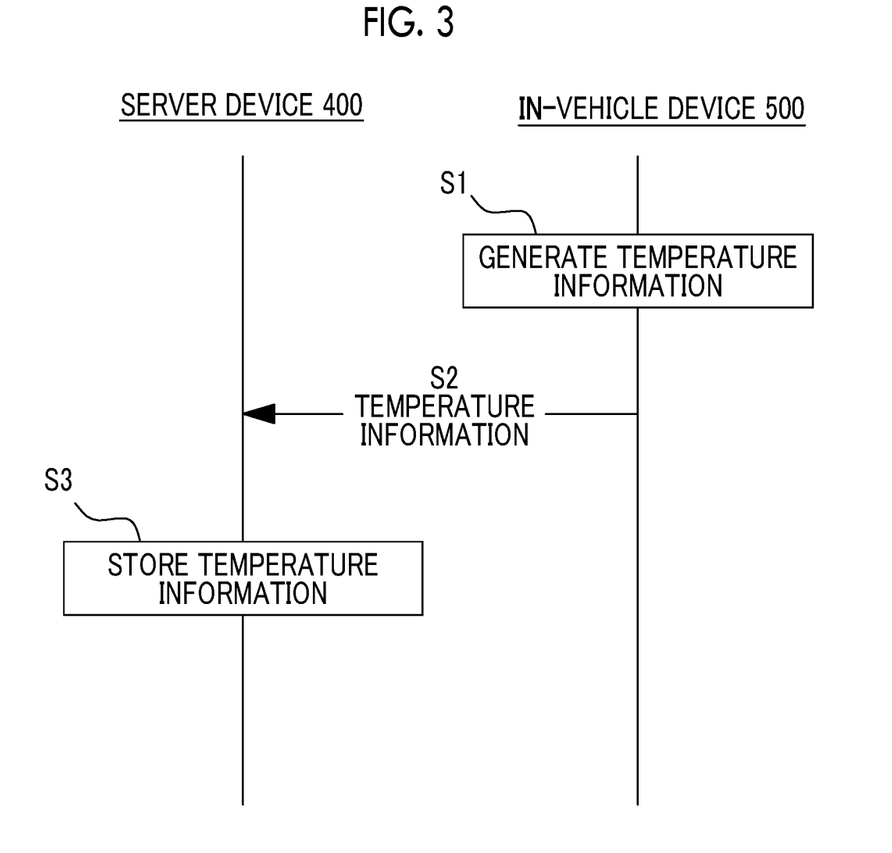
FIG. 3 is a flow diagram illustrating data that is transmitted and received between an in-vehicle device and a server device.
Figure 5:
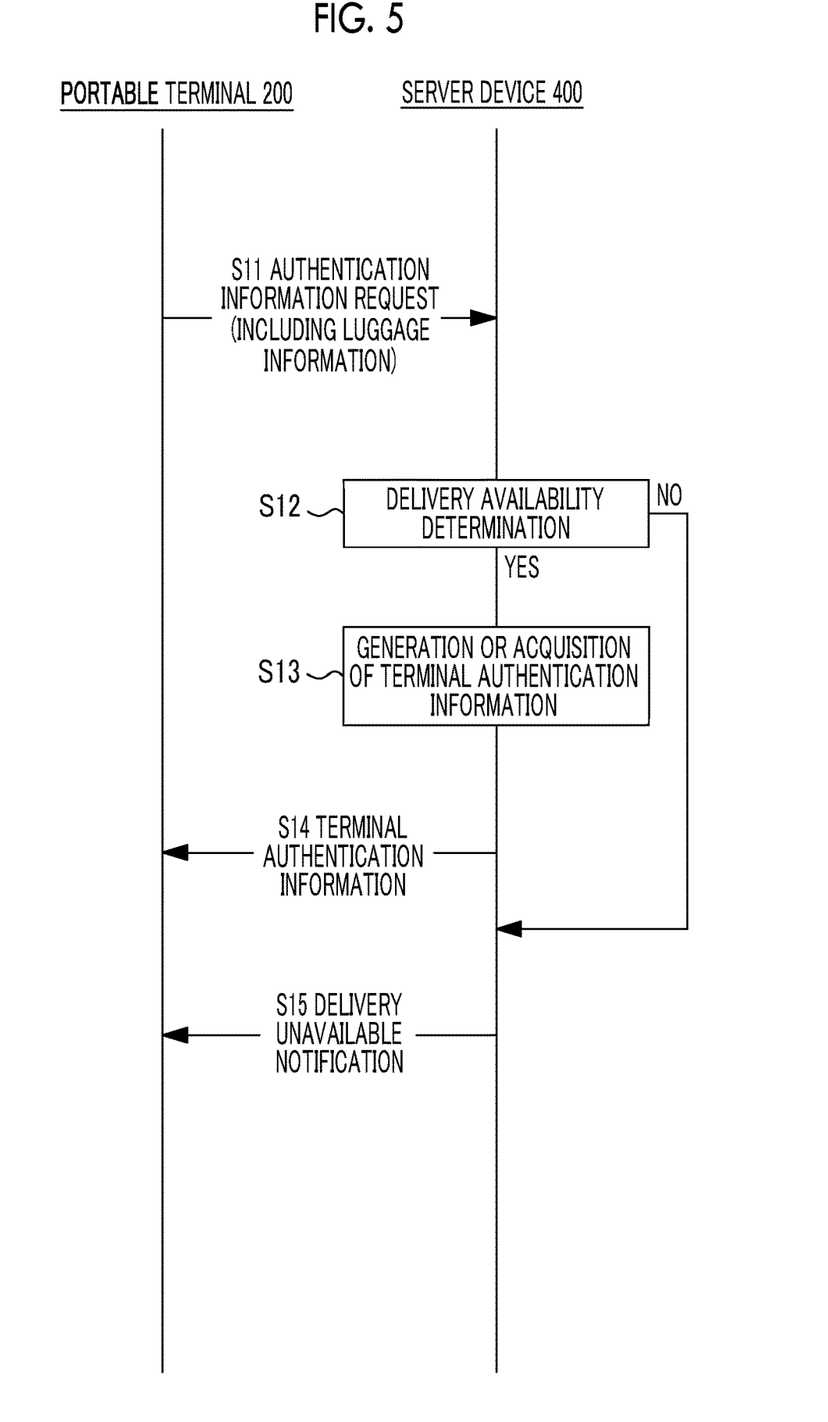
FIG. 5 is a flow diagram illustrating data that is transmitted and received between a portable terminal and the server device.
Figure 6:
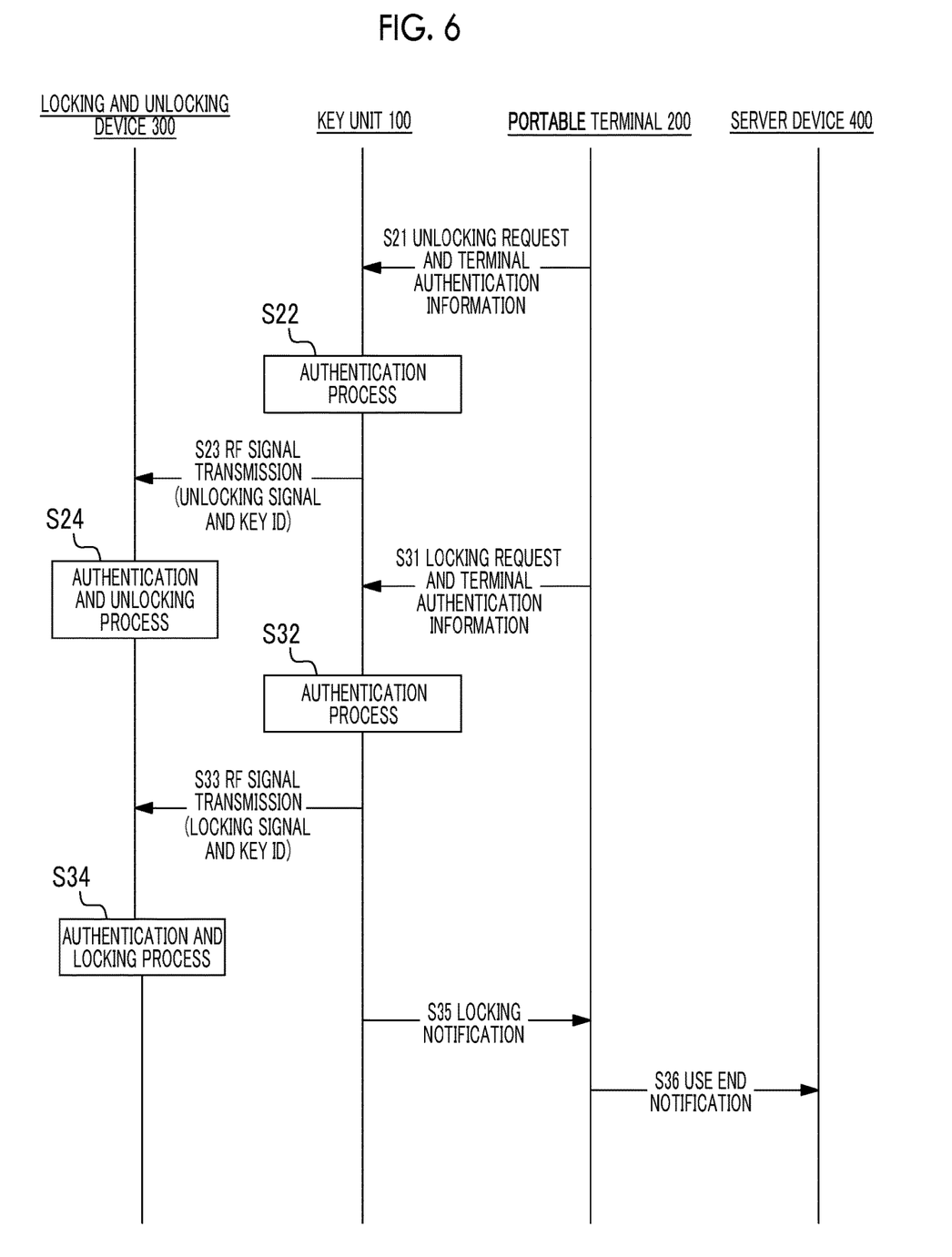
FIG. 6 is a flow diagram illustrating data that is transmitted and received when locking and unlocking of a vehicle are performed.

Next, a process performed by each of the above-described components will be described. The process can be divided into a phase (a first phase) in which the server device 400 collects the temperature information acquired by the vehicle, a phase (a second phase) in which the portable terminal 200 issues a request to the server device 400 to acquire the terminal authentication information, and a phase (a third phase) in which the portable terminal 200 accesses the key unit 100 using the terminal authentication information and locks and unlocks the vehicle. FIG. 3 is a flow diagram illustrating the first phase, and FIG. 5 is a flow diagram showing the second phase. FIG. 6 is a flow diagram illustrating the third phase.

Figure 4:
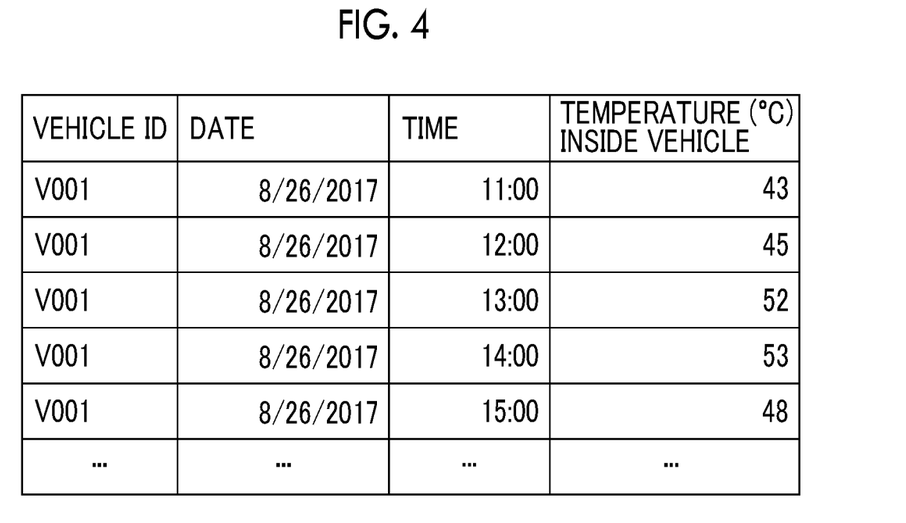
FIG. 4 is a table diagram illustrating information that is managed by the server device.

The first phase will be described with reference to FIG. 3. Processes of steps S1 to S3 are periodically executed during parking of the target vehicle. First, the in-vehicle device 500 measures the temperature inside the vehicle cabin via the temperature acquisition unit 501 and generates temperature information (step S1). The generated temperature information is transmitted to the server device 400 via the communication unit 502 (step S2). The temperature information management unit 4021 included in the server device 400 stores the received temperature information together with date and time information in association with an identifier of the vehicle (step S3). FIG. 4 illustrates an example of the temperature information stored in step S3.

The second phase will be described with reference to FIG. 5. Processes of steps S11 to S15 are executed when there is a request to issue terminal authentication information from the portable terminal 200. First, in step S11, the portable terminal 200 requests the server device 400 to issue the terminal authentication information. The terminal authentication information described herein is not information used for the locking and unlocking device 300 to authenticate the key unit 100, and is information used for the key unit 100 to authenticate the portable terminal 200. In the above step, the following information is transmitted at the same time.

(1) Authentication information request
(2) Information for identifying the portable terminal 200
(3) Information for identifying the vehicle 10 that is a delivery destination (hereinafter referred to as vehicle information)
(4) Luggage information on a luggage delivered to the vehicle 10. Information on a scheduled delivery date and time (time period) of the luggage and a flag indicating whether or not groceries are included in the luggage are included.

In step S12, the delivery availability determination unit 4023 included in the server device 400 reads corresponding temperature information from the storage unit 403 based on the acquired vehicle information. The temperature inside the vehicle cabin in a scheduled delivery time period is predicted based on acquired luggage information. The prediction of the temperature may be simply performed based on the most recently acquired temperature information or may be performed by referring to the temperature information received and stored in the past. For example, as illustrated in FIG. 4, it is possible to predict the temperature inside the vehicle cabin in the scheduled delivery time period by referring to the temperature information in time series received in the past. The prediction of the temperature may be performed based solely on the temperature information acquired from the vehicle or may be performed by referring to other information (weather information or the like). As a result, when a predicted maximum temperature in the scheduled delivery time period is equal to or more than a predetermined value and groceries are included in the luggage, "delivery unavailable" is determined. In cases other than the above-described case, "delivery available" is determined.

Here, although the determination is made using solely the maximum temperature, a temperature after the delivery or a change in the temperature may be predicted and used for the determination. For example, when the scheduled delivery time period is close to sunset, a decrease in the temperature inside the vehicle cabin after delivery can be predicted. An expected time taken until the luggage is taken out from the vehicle may be used. For example, when a time at which the consignee returns home is known in advance, it is possible to predict a time from delivery to taking-out of the luggage. Therefore, the determination may be made further using a period of time in which the predicted temperature continues.

When delivery available is determined in step S12, the key issuance unit 4022 generates or acquires the terminal authentication information (that is, corresponding to the key unit 100 mounted on the target vehicle) unique to the portable terminal 200 in step S13, and transmits the terminal authentication information to the portable terminal 200 (step S14). Accordingly, a manipulation of unlocking the vehicle 10 can be performed on the portable terminal 200. When delivery unavailable is determined in step S12, the delivery availability determination unit 4023 notifies the portable terminal 200 that the delivery is unavailable in step S15. Since the processes of steps S11 to S15 are a preparation process for locking and unlocking, it is preferable for the processes to be performed in advance. For example, the processes may be executed in a preparation step of the delivery.

The third phase will be described with reference to FIG. 6. Steps S21 to S24 are processes for unlocking the vehicle 10 using the portable terminal 200. When the user of the portable terminal 200 (that is, a person in charge of delivery) performs a manipulation of unlocking the vehicle 10 via the input and output unit 204, the portable terminal 200 transmits an unlocking request and the terminal authentication information to the key unit 100 in step S21. In step S22, the authentication unit 1032 of the key unit 100 compares the terminal authentication information transmitted from the portable terminal 200 with the device authentication information stored in advance and performs authentication process.

When the authentication is successful, the communication processing unit 1031 of the key unit 100 transmits an unlocking signal and the key ID to the locking and unlocking device 300 in step S23. In step S24, the authentication unit 3021 of the locking and unlocking device 300 performs the authentication process based on the received key ID. As a result, when the authentication is successful, the key controller 3022 unlocks the door of the vehicle 10. In this case, answer back or the like may be performed.

Steps S31 to S36 are processes of locking the vehicle 10 using the portable terminal 200. When the user of the portable terminal 200 performs a manipulation of locking the vehicle 10 via a touch panel screen, the portable terminal 200 transmits a locking request and the terminal authentication information to the key unit 100 in step S31. In step S32, the authentication unit 1032 included in the key unit 100 compares the terminal authentication information transmitted from the portable terminal 200 with the device authentication information stored in advance and performs authentication process.

When the authentication is successful, the communication processing unit 1031 of the key unit 100 transmits a locking signal and a key ID to the locking and unlocking device 300 in step S33. In step S34, the authentication unit 3021 included in the locking and unlocking device 300 performs the authentication process based on the received key ID. As a result, when the authentication is successful, the key controller 3022 locks the door of the vehicle 10.

After the communication processing unit 1031 of the key unit 100 transmits the locking signal, the communication processing unit 1031 of the key unit 100 transmits a notification (a locking notification) indicating that the locking has been completed, to the portable terminal 200 (step S35). Accordingly, the notification that the locking has been completed is output on the touch panel screen of the portable terminal 200. When the terminal authentication information is a one-time key, the one-time key may be invalidated at the timing of step S35. The portable terminal 200 generates a notification that the use of the system has ended, and transmits the notification to the server device 400 (step S36).

According to the above-described embodiment, it is possible to appropriately determine whether or not the delivery is available based on the result of sensing an environment within the vehicle scheduled for delivery.

Although the notification is transmitted solely to the portable terminal 200 when a determination is made that the delivery is unavailable in the example of FIG. 5, the same notification to a portable terminal (not illustrated) possessed by a consignee may be performed. Accordingly, it is possible to prompt a change of the time period or a reception place.

Second Embodiment

In the first embodiment, when the determination is made that the delivery cannot be performed in step S12, the portable terminal 200 is notified that the determination is made that the delivery cannot be performed, and the process ends. On the other hand, the second embodiment is an embodiment in which a time period in which the delivery is available is determined and notified.

Figure 7:
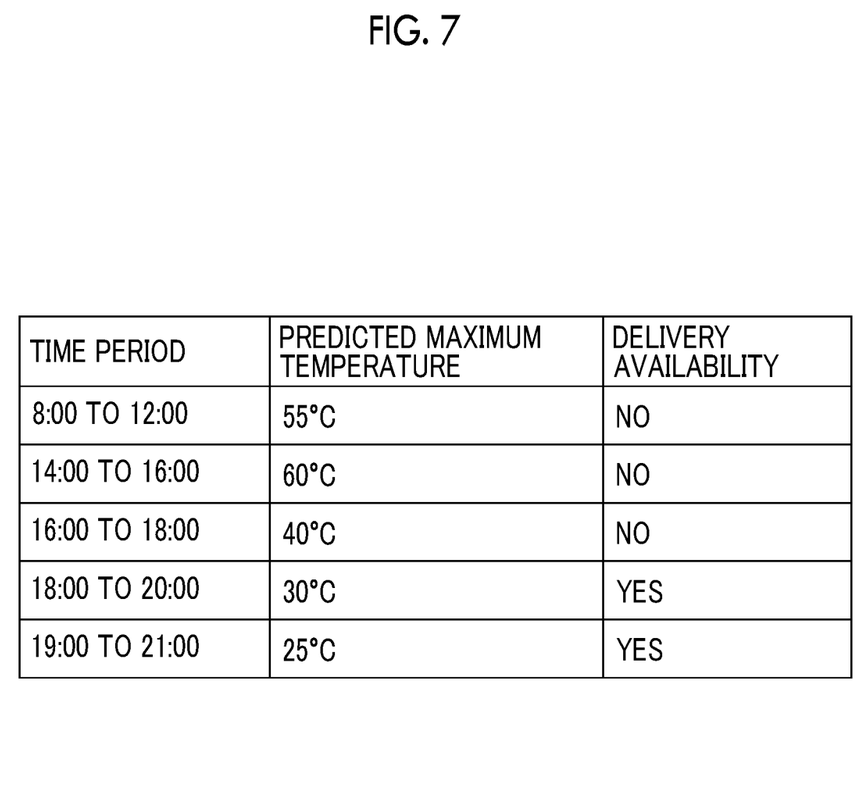
FIG. 7 is a table diagram illustrating a result of delivery availability determination performed in each time period.

In the second embodiment, when the delivery availability determination unit 4023 included in the server device 400 performs the determination in step S12, the delivery availability determination unit 4023 performs the same determination with respect to time periods before and after the scheduled delivery time period, and searches for a time period in which the delivery is available. For example, it is assumed that "8 AM to noon", "2 PM to 4 PM," "4 PM to 6 PM," "6 PM to 8 PM," and "7 PM to 9 PM" are defined as the time periods. It is assumed that the scheduled delivery time period included in the luggage information is "noon to 2 PM". FIG. 7 is a table diagram illustrating results of the delivery availability determination performed for each time period. In the case of this example, it is seen that the delivery in the designated time period is "unavailable".

In the second embodiment, when delivery in a designated time period is "unavailable", a time period in which the delivery is available around preceding and following time periods is searched for. As a result, when there is a time period in which the delivery is available, the portable terminal 200 is notified that there is the time period in which the delivery is available. In the case of the illustrated example, when it is after 6:00 pm, the portable terminal 200 is notified that the delivery is available. The notification may be transmitted solely to the portable terminal 200 possessed by the person in charge of delivery or may be transmitted to the portable terminal (not illustrated) possessed by the consignee.

As described above, according to the second embodiment, it is possible to receive luggage after changing a time period.

Third Embodiment

In the first and second embodiments, the determination result of step S12 is output as "available" or "unavailable".

On the other hand, a third embodiment is an embodiment in which the availability determination is performed with a condition. For example, in a case where a determination is made that a temperature rise is gentle in a target time period and a luggage does not deteriorate when the luggage is taken out within a predetermined time after delivery, the delivery availability determination is made, for example, on condition that "the luggage take out within one hour after delivery".

In addition, when the in-vehicle environment changes by operating an air conditioner of the vehicle, a determination as to whether or not the delivery is available may be made on condition that the air conditioner operates. For example, when the inside of the vehicle becomes an environment suitable for temporary storage of the luggage by operating the air conditioner or a heater included in the vehicle, a notification to the consignee or an owner of the vehicle may be performed, and the air conditioner may be operated when a permission is obtained. This aspect is particularly useful in electric vehicles or the like.

Modification Example

The above-described embodiment is merely an example, and the present disclosure can be appropriately modified and implemented without departing from a gist of the present disclosure.

For example, although it is assumed that the temperature information is information corresponding to a single area in the description of the embodiment, a plurality of sensors may be disposed in each area in which a luggage can be stored, and temperature information for a plurality of places (for example, inside the trunk and the vehicle cabin) may be transmitted from the vehicle 10 to the server device 400. In this case, in step S12, the temperature information corresponding to the area in which the storage of the luggage is scheduled may be acquired and the determination may be made. A determination may be performed as to whether or not the delivery is available for a plurality of areas and the portable terminal 200 may be notified of a result of the determination.

Although the authentication information request, the luggage information, and the like are transmitted from the portable terminal 200 in the description of the embodiment (step S11), for example, a computer managed by a delivery company may transmit the information to the server device 400. In this case, corresponding terminal authentication information (or notification indicating delivery unavailable) may be push-transmitted from the server device 400 to the portable terminal 200.

Although the flag indicating "whether or not groceries are included" is exemplified as the luggage information in the description of the embodiment, content of the luggage may be defined using information other than the exemplified information. For example, a plurality of levels may be defined according to painfulness. According to the level, a threshold value of the temperature used in step S12 may be made different.

Although the value indicating the temperature inside the vehicle is exemplified as the temperature information in the description of the embodiment, information other than the temperature may be used as long as the information other than the temperature can be used for the determination as to whether the delivery is available based on information sensed by the vehicle. For example, temperature and humidity may be both used. Further, the information acquired from the vehicle 10 may not be a numerical value such as the temperature or the humidity. For example, the information may be information indicating a parking position of the vehicle 10 (for example, indoor, outdoor, or a place exposed to direct sunlight). The server device 400 may determine whether or not the storage of a luggage is possible based on the above-described information.

Although the temperature information periodically acquired from the vehicle is accumulated in the server device 400 in the description of the embodiment, the accumulation of the temperature information is not indispensable. For example, the server device 400 may make an inquiry to the vehicle at a timing when there is a request from the portable terminal 200 to acquire the temperature information.

Although the aspect in which the locking and unlocking device 300 and the key unit 100 are independent is exemplified in the description of the embodiment, an aspect in which the locking and unlocking device 300 directly communicates with the portable terminal 200 to perform locking and unlocking of the vehicle may be adopted. Using the key unit 100 has an advantage that it is possible to use an existing smart key system, but the locking and unlocking device 300 may directly perform wireless communication with the portable terminal 200.

Although the delivery availability determination (step S12) and the issuance of the terminal authentication information (step S13) are successively performed in the description of the embodiment, the above processes may be executed at different timings. For example, solely the delivery availability determination may be independently performed, separately from the process illustrated in FIG. 5. For example, the delivery availability determination may be made at a timing such as before shipment of a luggage (for example, at the time of ordering at an electronic commerce (EC) site), and the consignee may be notified that the luggage cannot arrive at the consignee in the designated time period.

What is claimed is:

1. A server device comprising:
control circuitry configured to
acquire temperature information that is information associated with a temperature of a predetermined compartment inside a vehicle, the predetermined compartment configured to store luggage and to be locked and unlocked,
acquire luggage information including information on a content of the luggage to be stored in the predetermined compartment, and
determine whether the predetermined compartment is suitable for storage of the content of the luggage at a scheduled storage time of the luggage based on the temperature information.

2. The server device according to claim 1, wherein the luggage information includes a time period in which the storage of the luggage is scheduled.

3. The server device according to claim 1, wherein the control circuitry is configured to perform a notification to a predetermined device when the control circuitry determines that the predetermined compartment will be at a temperature unsuitable for storage of the content at the scheduled storage time of the luggage.

4. The server device according to claim 1, wherein the control circuitry is configured to transmit key information for unlocking the predetermined compartment to a portable terminal possessed by a user storing the luggage when the control circuitry determines that the predetermined compartment is at a temperature suitable for storage of the content at the scheduled storage time of the luggage.

5. The server device according to claim 1, wherein the control circuitry is configured to periodically acquire and store temperature information associated with the predetermined compartment from the vehicle.

6. The server device according to claim 5, wherein the control circuitry is configured to predict a temperature of the predetermined compartment after the luggage is stored by referring to the stored temperature information and make the determination based on a result of the prediction.

7. The server device according to claim 5, wherein the control circuitry is configured to predict a temperature of the predetermined compartment in a time period before and after the luggage is stored by referring to the stored temperature information, and further to determine a time period in which the predetermined compartment will obtain a temperature suitable for storage of the content.

8. The server device according to claim 5, further comprising a storage unit configured to store the temperature information acquired by the control circuitry.

9. A management system comprising:
a vehicle including a compartment configured to store luggage and to be locked and unlocked; and
a server device including control circuitry configured to determine whether storage of the luggage in the vehicle is available, wherein:
the vehicle includes a temperature information transmission unit configured to transmit temperature information that is information associated with a temperature of the compartment inside the vehicle, to the server device; and
the control circuitry is further configured to
acquire the temperature information,
acquire luggage information including information on a content of the luggage to be stored in the compartment, and
determine whether the predetermined compartment is suitable for storage of the content of the luggage at a scheduled storage time of the luggage based on the temperature information.

10. A server device comprising:
control circuitry configured to
acquire temperature information that is information associated with a temperature of a predetermined compartment inside a storage device, the predetermined compartment configured to store luggage and to be locked and unlocked,
acquire luggage information including information on a content of the luggage to be stored in the predetermined compartment, and
determine whether the predetermined compartment is suitable for storage of the content of the luggage at a scheduled storage time of the luggage based on the temperature information.

11. The server device according to claim 1, wherein the predetermined compartment is a trunk or cabin of the vehicle.

12. The management system according to claim 9, wherein the compartment is a trunk or cabin of the vehicle.

13. The server device according to claim 1, wherein the control circuitry is configured to predict a temperature of the predetermined compartment inside the vehicle at the scheduled storage time of the luggage.

14. The management system according to claim 9, wherein the control circuitry is configured to predict a temperature of the compartment inside the vehicle at the scheduled storage time of the luggage.

15. The server device according to claim 10, wherein the control circuitry is configured to predict a temperature of the predetermined compartment inside the storage device at the scheduled storage time of the luggage.

* * * * *